US008194238B1

(12) United States Patent
Hedger

(10) Patent No.: US 8,194,238 B1
(45) Date of Patent: Jun. 5, 2012

(54) OPTICAL SENSOR COMPONENT IDENTIFICATION AND INTERROGATION SYSTEM

(75) Inventor: Dan Hedger, Kerrville, TX (US)

(73) Assignee: Killdeer Mountain Manufacturing, Inc., Killdeer, ND (US)

( * ) Notice: Subject to any disclaimer, the term of this patent is extended or adjusted under 35 U.S.C. 154(b) by 859 days.

(21) Appl. No.: 11/706,142

(22) Filed: Feb. 14, 2007

Related U.S. Application Data

(60) Provisional application No. 60/772,946, filed on Feb. 14, 2006.

(51) Int. Cl.
*G01N 21/00* (2006.01)

(52) U.S. Cl. .................................................. 356/73.1

(58) Field of Classification Search .................. None
See application file for complete search history.

(56) References Cited

U.S. PATENT DOCUMENTS

| | | | | |
|---|---|---|---|---|
| 4,697,926 A * | 10/1987 | Youngquist et al. | ........... | 356/478 |
| 4,699,513 A * | 10/1987 | Brooks et al. | ............... | 356/478 |
| 4,812,645 A * | 3/1989 | Griffiths | ............... | 250/227.14 |
| 4,820,916 A * | 4/1989 | Patriquin | ............... | 250/208.2 |
| 4,870,269 A * | 9/1989 | Jeunhomme et al. | ..... | 250/227.12 |
| 5,125,738 A * | 6/1992 | Kawamura et al. | ............. | 356/44 |
| 5,181,026 A * | 1/1993 | Granville | ............... | 340/870.28 |
| 5,283,429 A * | 2/1994 | Campolo | ............... | 250/227.14 |
| 5,297,224 A * | 3/1994 | Shaw | ............... | 385/12 |
| 5,696,863 A * | 12/1997 | Kleinerman | ............... | 385/123 |
| 6,256,090 B1 * | 7/2001 | Chen et al. | ............... | 356/73.1 |
| 6,265,880 B1 | 7/2001 | Born et al. | | |
| 6,271,766 B1 * | 8/2001 | Didden et al. | ............ | 340/853.1 |
| 6,449,400 B1 * | 9/2002 | Watanabe et al. | ............... | 385/12 |
| 6,561,488 B1 * | 5/2003 | Walker | ............... | 254/134.4 |
| 6,778,717 B2 * | 8/2004 | Tapanes et al. | ............... | 385/12 |
| 6,813,403 B2 * | 11/2004 | Tennyson | ............... | 385/12 |
| 6,943,340 B2 * | 9/2005 | Tubel et al. | ............... | 250/227.14 |
| 6,949,933 B2 * | 9/2005 | Weaver | ............... | 324/541 |
| 6,995,677 B2 * | 2/2006 | Aronstam et al. | ............. | 340/606 |
| 7,075,424 B1 * | 7/2006 | Sundaresan et al. | ......... | 340/500 |
| 7,117,742 B2 * | 10/2006 | Kim | ............... | 73/587 |
| 7,277,822 B2 * | 10/2007 | Blemel | ............... | 702/183 |
| 7,420,666 B2 * | 9/2008 | Maehara et al. | ............. | 356/73.1 |
| 7,437,071 B2 * | 10/2008 | Bhat et al. | ............... | 398/45 |
| 7,461,561 B2 * | 12/2008 | Morrison et al. | ............. | 73/800 |
| 7,514,670 B2 * | 4/2009 | Anderson et al. | ........ | 250/227.14 |
| 7,532,781 B2 * | 5/2009 | Thompson et al. | ............. | 385/13 |

(Continued)

*Primary Examiner* — Tarifur Chowdhury
*Assistant Examiner* — Gordon Stock, Jr.
(74) *Attorney, Agent, or Firm* — James Creighton Wray

(57) ABSTRACT

A system includes a microprocessor, storage device, test instrument, switching system, main switching system with subsidiary, switching systems and the sensors. The program that is executed by the microprocessor accesses the database stored on the storage device. The microprocessor accesses information in the database and directs the switching system to select the appropriate sensor. Once the switching system has selected the appropriate sensor, the microprocessor then tells the test instrument to send a signal to the sensor. The test instrument sends the signal and collects the measured data. The measured data is then sent to the microprocessor, where the measured data is analyzed and compared with the baseline data. The comparison between the measured data and the baseline data reveals any anomalies that are occurring over the length of the sensor. The microprocessor displays the anomalies and keys an alarm when the anomalies are detected.

30 Claims, 5 Drawing Sheets

U.S. PATENT DOCUMENTS

| | | | |
|---|---|---|---|
| 7,688,673 B2 * | 3/2010 | Ronnekleiv et al. | 367/14 |
| 7,706,640 B2 * | 4/2010 | Pizzorno et al. | 385/12 |
| 7,781,725 B2 * | 8/2010 | Mossman | 250/227.16 |
| 2006/0230839 A1 * | 10/2006 | Morrison et al. | 73/800 |
| 2007/0171402 A1 * | 7/2007 | Watley et al. | 356/73.1 |
| 2007/0257186 A1 * | 11/2007 | Delcher et al. | 250/208.2 |
| 2008/0292237 A1 * | 11/2008 | Vincelette | 385/12 |
| 2009/0257747 A1 * | 10/2009 | Kokkinos | 398/34 |

\* cited by examiner

OPTICAL SENSOR COMPONENT IDENTIFICATION AND INTERROGATION SYSTEM

This application claims the benefit of U.S. Provisional Application No. 60/772,946 filed Feb. 14, 2006, which is hereby incorporated by reference in its entirety.

TECHNICAL FIELD OF THE INVENTION

The present invention relates to the field of conduit diagnostic and health monitoring for critical conduits.

BACKGROUND OF THE INVENTION

Current optical sensing technologies are prone to erroneous data or failure. Critical conduits in hard to inspect areas may fail, potentially causing catastrophic results. Furthermore, current methods of maintenance are not ideal for locating and detecting all potential errors.

Needs exist for improved error detection for optical sensor technologies. Needs also exist for methods to detect conduit chafing and problems such as pinch points, installation problems and tightness relative to conduit clearances.

SUMMARY OF THE INVENTION

The present invention provides a method and apparatus for monitoring integrity of several sensors and determining locations of anomalies. An anomaly is defined as a defect that occurs to the sensing element (optical fiber, electrical wire, etc) in which a test instrument can measure the defect. The present invention detects conduit chafing and other problems, such as pinch points, installation problems and tightness relative to conduit clearances.

The new system includes a microprocessor, storage device, test instrument, switching and splitting system, main switching and/or splitting system with subsidiary switching and/or splitting systems and the sensors in sensing systems A and B. The microprocessor controls the switching and/or splitting system, the test instrument, and the storage device. The program that is executed by the microprocessor accesses the database stored on the storage device. The database has the information on the type of sensor, the location of the sensor, and the baseline information of the sensor. The microprocessor accesses this information and directs the switching and/or splitting system to select the appropriate sensor. Once the switching and/or splitting system has been selected for the appropriate sensor interrogation process, the microprocessor then tells the test instrument to send a signal to the sensor. The test instrument sends the signal and collects the measured data. The measured data is then sent to the microprocessor, where the measured data is analyzed and compared with the baseline data. The comparison between the measured data and the baseline data reveals any anomalies that are occurring over the length of the sensor. The microprocessor displays the anomalies and keys an alarm when the anomalies are detected. A graphical user interface can be utilized to tailor the displayed information to various users.

The sensors may be optical fibers, electrical wires, insulators, capacitors, resistors, or any sensors which are mounted in arrays.

The system includes 1 to n main switching systems, each with 1 to n subsidiary switching systems. Each subsidiary switching system has 1 to n sensors. The sensors are connected over the entire length or surface of a protected device, area or volume. The new system allows each sensor in the array to be separately tested for any anomalies that may be indicative of problems or potential failures in or within the shield.

The sensor system can be used both periodically and continuously onboard in support equipment. The sensor also can optionally determine the temperature change at a location by using an Optical Time Domain Reflectometer (OTDR) to monitor the temperature of an optical fiber that is doped with rare earth elements when used as a continuously monitored onboard system. Optical fibers that are doped with rare earth elements are currently used within the optical amplifiers for optical networks. The rare earth elements that are used within the optical amplifiers are three and four energy level systems. The lowest energy level is where most of the electrons of the rare earth element reside; this is called the ground state. The upper energy levels above the ground state become populated with electrons by an external source. This source can be a laser, an electric field, or through a temperature change. The excited electrons eventually fall from the upper energy level back to the ground state. In the process of falling to the ground state, the electron releases its energy by emitting light. The emitted light travels down the optical fiber and combines with the light already in the optical fiber.

Since a temperature change at a particular location results in the generation of light at that location, the temperature change is detected by monitoring the optical fiber for the generation of light. This can be done by an OTDR. The OTDR sends an optical pulse down an optical fiber. When the optical pulse interacts with the optical fiber, some of the light is sent back to the OTDR where the OTDR collects the light and determines the amount of loss within the optical fiber from the returned light.

Combining the light that is generated from the excited electrons of the rare earth atoms (resulting from a change in temperature) and the OTDR generated optical pulse does not result in a loss within the optical fiber but results in a gain. This additional light that results from the excited electrons of the rare earth element combines with the OTDR light and amplifies the OTDR signal. The point at which the amplification occurs is where the temperature has changed.

To detect changes in temperature at a very finite location, a nontraditional OTDR is required; one that can detect changes over a very small distance. One such OTDR is a photon counting OTDR.

A new optical technology that can be used optionally is identification tags called optical tags. The data stored within the optical tags has to be extracted by probing the optical tags with an optical source such as a laser. The optical source transmits either a single wavelength or multiple wavelengths through an optical tag. The information contained within the optical tag is collected by the light that is emitted from the optical source and transmitted to an optical detector. The optical detector converts the light that was coded by the information within the optical tag into an electrical signal, which is sent to be analyzed. The analysis is performed by a microprocessor which decodes the information stored on the optical tag and produces an output. The type of information that can be stored on the optical tags is similar to the type of information that can be stored on a barcode, such as lot number, type of device, model numbers, etc. The information stored on the optical tag could direct a user to a virtual information description or a look-up file of additional information.

The optical tags store personal or document identification or identifying items or cargo in containers.

Since the new optical tagging technology is particularly beneficial when multiple sensors are operated as instrumentation in a sensor system, the ability to store detailed information of various types of data in another location from the sensor (e.g. to be accesses over the interne as instructed by the optical tag on the sensor, or a remote database of some kind). The optical tagging can allow the individual sensor within a network to be plugged and played as desired by the central interrogation system. Thus, when an individual sensor is removed or replaced, the central interrogation portion of the system can be automatically reprogrammed to recognize the new sensor within the network and make any adjustments as are needed to the overall network.

In one preferred embodiment, an OTDR is optically connected to an input port of an optical splitter. Output ports of the optical splitter are connected to sensing fibers. The optical splitter splits the input signal of the OTDR equally between the sensing fibers, allowing all the sensing fibers to be tested at one time.

To test a multi-fiber sensing system, the OTDR sends an optical signal into the splitter. The optical splitter evenly divides the optical signal and sends the divided signals down each of the sensing fibers. The optical signal travels down each fiber where some of the optical signals within each sensing fiber are reflected back to the OTDR.

The OTDR analyzes the reflected optical signal and produces an OTDR trace describing loss in power as a function of position. $L_T$ is the length of the sensing fiber. The overall OTDR trace results of the multi-fiber system are a superposition of each individual fiber. If there is no change in the fiber characteristics due to an anomaly, i.e. pressure, temperature, electrical field, chafing, etc., the OTDR trace will not have unexpected peaks. However, if there is an anomaly, such as a break in one of the sensing fibers, an OTDR trace shows the effects of the anomaly somewhere between 0 and $L_T$.

These and further and other objects and features of the invention are apparent in the disclosure, which includes the above and ongoing written specification, with the drawings.

DETAILED DESCRIPTION OF THE PREFERRED EMBODIMENTS

Figure 1:
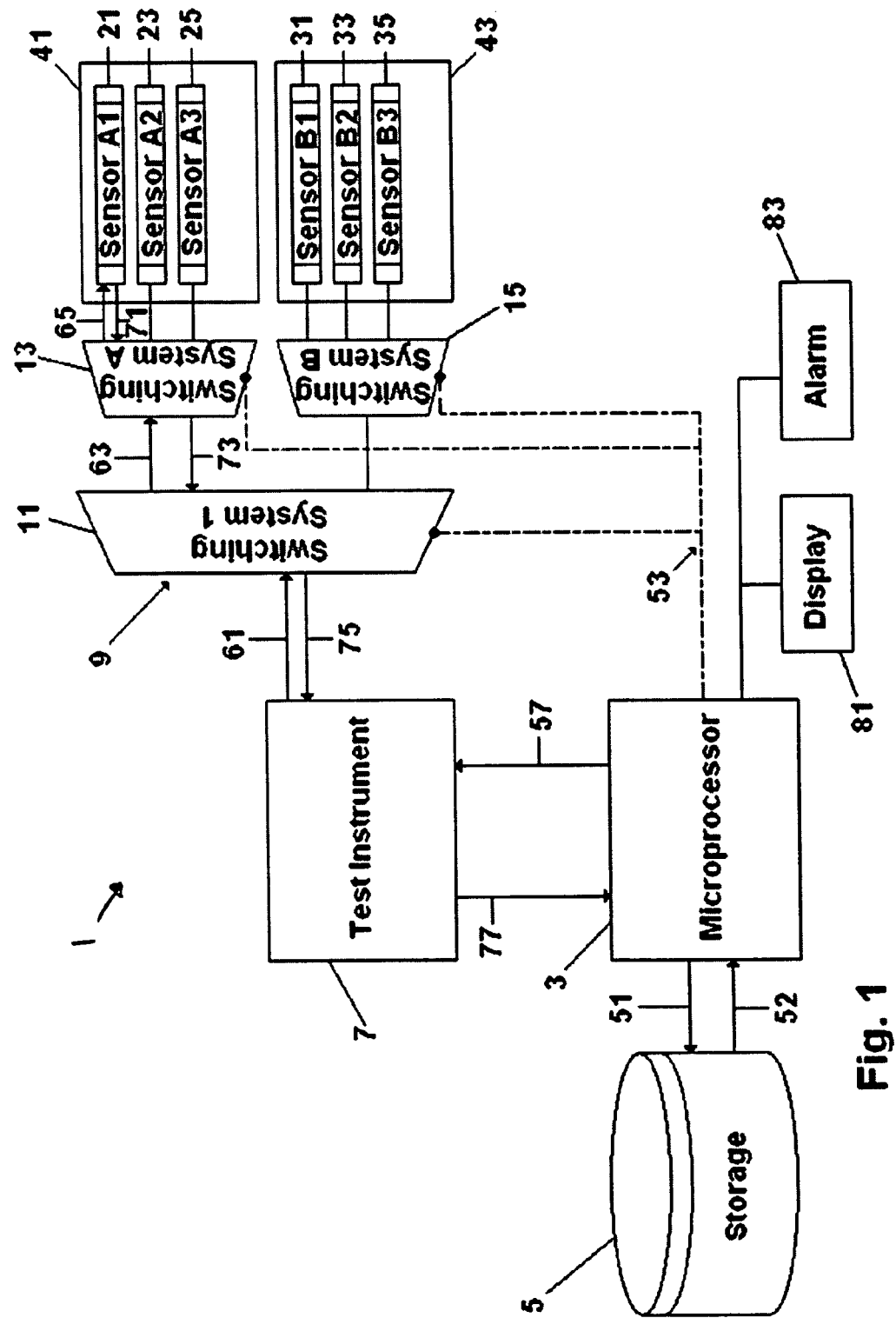
FIG. 1 is a schematic representation of a monitor for a sense shield.

The new system 1 includes a microprocessor 3, storage device 5, test instrument 7, switching system 9, main switching system 11 with subsidiary switching systems 13, 15 and the sensors 21, 23, 35, 31, 33, 35 in sensing systems A 41 and B 43. The microprocessor 3 controls the switching system 9, the test instrument 7, and the storage device 5. The program that is executed by the microprocessor 3 accesses 51 the database stored on the storage device 5. The database has the information on the type of sensor n, the location of the sensor n, and the baseline information of the sensor n. The microprocessor 3 accesses 51 this information 52 and directs 53 the switching system 9 to select the appropriate sensor n. Once the switching system 9 has selected the appropriate sensor n, the microprocessor 3 then tells 57 the test instrument to send a signal to the sensor. The test instrument 7 sends 61, 63, 65 the signal and collects 71, 73, 75 the measured data. The measured data 77 is then sent to the microprocessor, where the measured data is analyzed and compared with the baseline data. The comparison between the measured data and the baseline data reveals any anomalies that are occurring over the length of the sensor. The microprocessor displays 81 the anomalies and keys an alarm 83 when the anomalies are detected.

The sensors may be optical fibers, electrical wires, insulators, capacitors, resistors, or any sensors which are mounted in arrays.

The system includes 1 to n main switching systems 11, each with 1 to n subsidiary switching systems 13, 15. Each subsidiary switching system has 1 to n sensors. The sensors are connected over the entire length or surface of a protected device, area or volume. The new system allows each sensor in the array to be separately tested for any anomalies that may be indicative of problems or potential failures in or within the shield.

Figure 2:
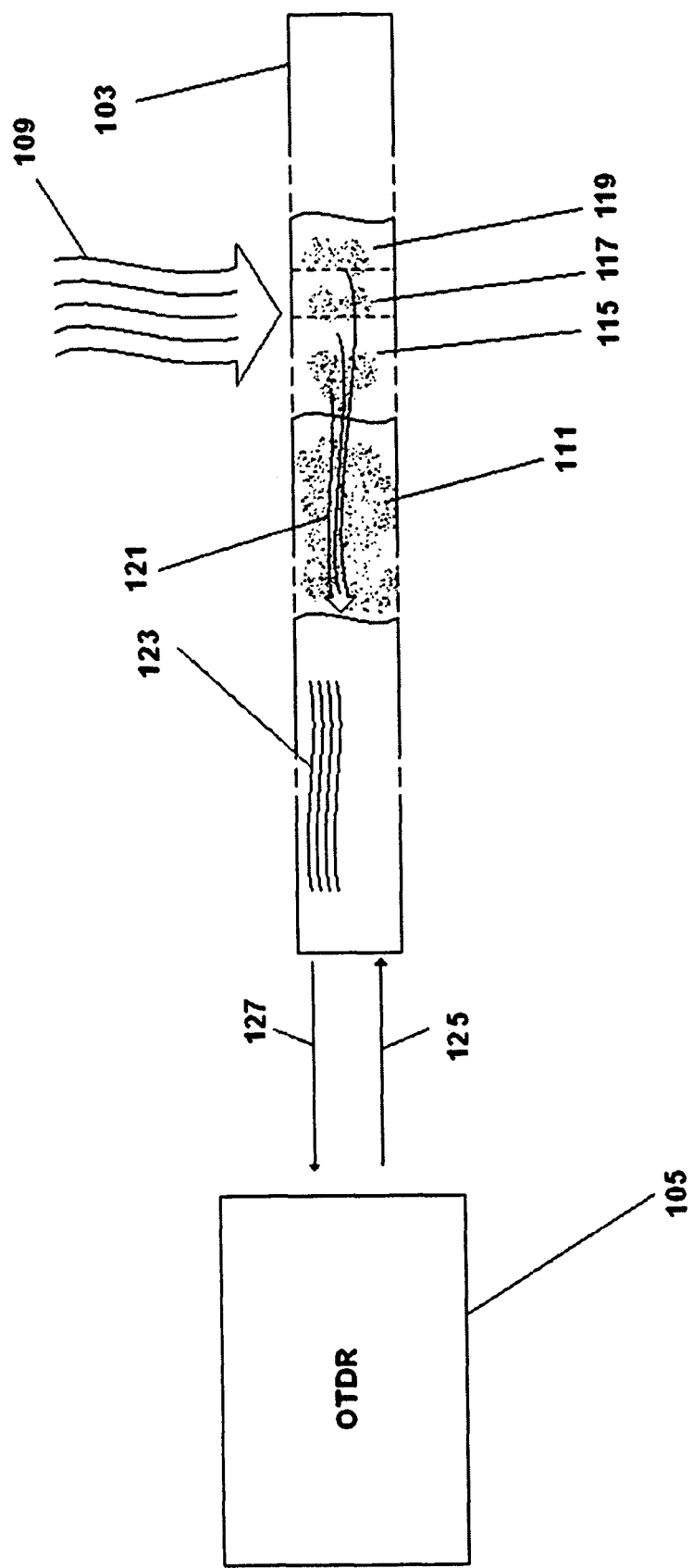
FIG. 2 is a schematic representation of the OTDR and optical fiber temperature sensing system.

The temperature sensing system in FIG. 2 determines the temperature change at a location by using an Optical Time Domain Reflectometer (OTDR) to monitor the temperature of an optical fiber 103 that is doped with rare earth elements. Optical fibers that are doped with rare earth elements are currently used within the optical amplifiers for optical networks. The rare earth elements that are used within the optical amplifiers are three and four energy level systems. The lowest energy level is where most of the electrons of the rare earth element reside; this is called the ground state 111. The upper energy levels 115, 117, 119 above the ground state become populated with electrons by an external source 109. This source can be a laser, an electric field, or through a temperature change. The excited electrons eventually fall from the upper energy level back to the ground state. In the process of falling to the ground state, the electron releases its energy by emitting light 121. The emitted light 121 travels down the optical fiber and combines with the light 123 already in the optical fiber 103.

Since a temperature change at a particular location results in the generation of light at that location, the temperature change is detected by monitoring the optical fiber for the generation of light. This can be done by an OTDR 105. The OTDR sends 125 an optical pulse down an optical fiber. When the optical pulse interacts with the optical fiber, some of the light is sent back 127 to the OTDR where the OTDR collects the light and determines the amount of loss within the optical fiber from the returned light.

Combining the light that is generated from the excited electrons of the rare earth atoms (resulting from a change in temperature) and the OTDR generated optical pulse does not result in a loss within the optical fiber but results in a gain. This additional light that results from the excited electrons of the rare earth element combines with the OTDR light and amplifies the OTDR signal. The point at which the amplification occurs is where the temperature has changed.

To detect changes in temperature at a very finite location, a nontraditional OTDR is required, one that can detect changes over a very small distance. One such OTDR is a photon counting OTDR.

Figure 3:
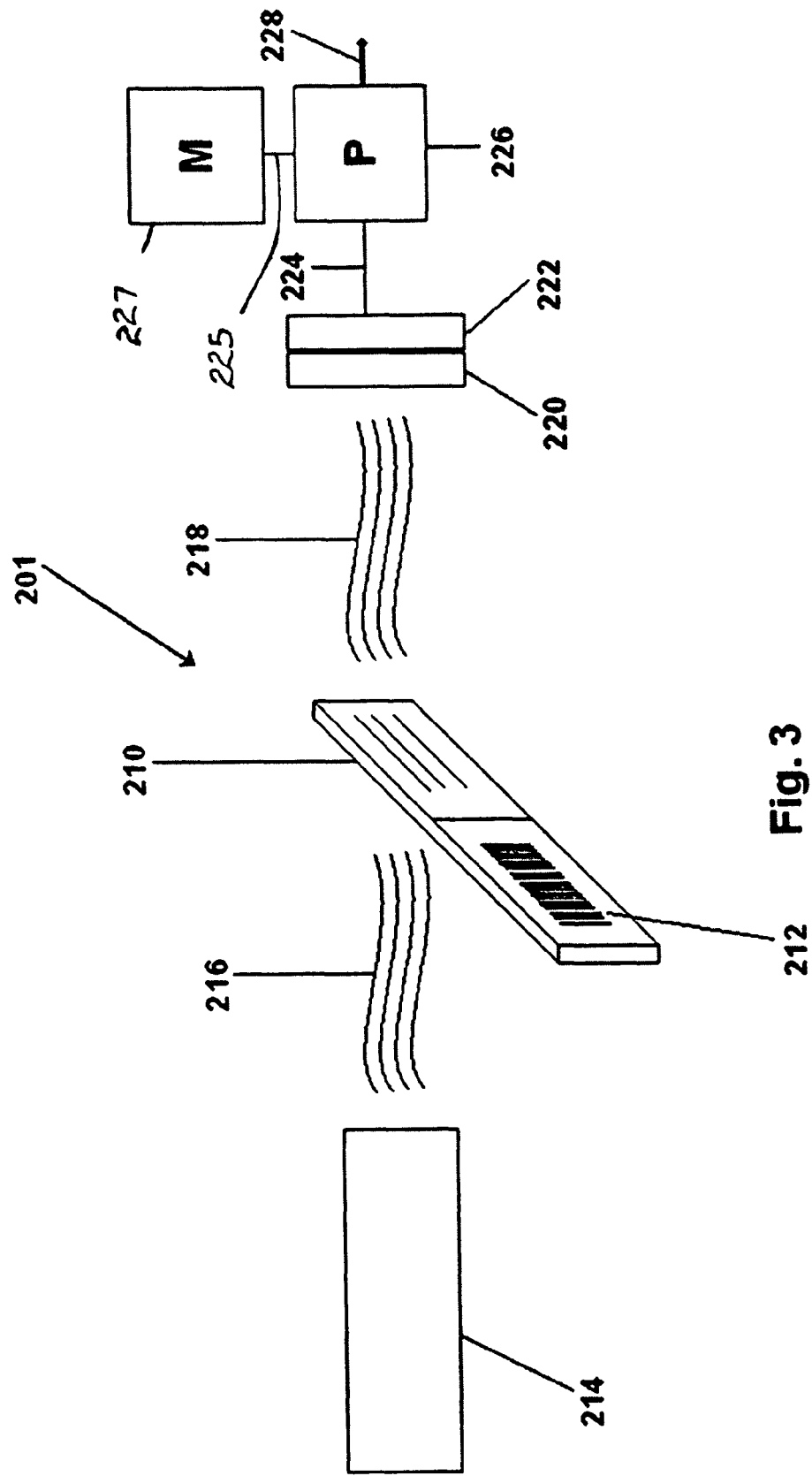
FIG. 3 is a schematic representation of the new optical identification system.

The new optical technology in FIG. 3 has a system 201 with identification tags 210 called optical tags. The data 212 stored within the optical tags has to be extracted by probing the optical tags with an optical source 214 such as a laser. The optical source transmits either a single wavelength 216 or multiple wavelengths through an optical tag. The information contained within the optical tag is collected by the light 216 that is emitted from the optical source 214 and transmitted 218 to an optical detector 220. The optical detector 220 converts 222 the light 218 that was coded by the information 212 within the optical tag 210 into an electrical signal 224, which is sent to be analyzed and compared with signals 225 from memory 227. The analysis is performed by a microprocessor 226 which decodes the information 212 stored on the optical tag 210 and produces an output 228. The type of information 212 that can be stored on the optical tags 210 is similar to the type of information that can be stored on a barcode, such as lot number, type of device, model numbers, etc.

The card may be opaque or translucent and may be opaque, translucent or colored when viewed with light from an ordinary light source so that no coded information within the tag is discernable. The wavelength or wavelengths 216 pass through the cards or tags except where the coded information contained therein stops the wavelength or wavelengths selectively. The coded information may change the wavelength of the input light or energy to another wavelength which is detectable by the detector.

The detector and source are on opposite sides of the tags in a preferred embodiment. Alternatively, a reflective layer on or in the tags reflects the wavelength with the coded information to a detector on the same side of the tags as the source. Preferably the detector has a detector array.

The tags are useful for personal or document identification or for identification of items or cargo in containers.

In a preferred embodiment the identification tag is read by sending an initial light transmission to the sensor and reading a signature of reflected light from the sensor. The light or wave energy is admitted to a first end of the sensor and internally reflected and the reflected light with the coded identification exists at the first end of the sensor and is read by the instrument as the identification of the sensor. The sensor identification is compared with a lookup table in the memory attached to the processor. The sensor standard return signal of each sensor is also recorded in the memory in a lookup table.

When the real time return signal significantly differs from the recorded return signal outside of a measurement range, the sensor information is disregarded and the individual identified and tagged sensor is replaced at the next maintenance opportunity. The identification and the standard return signal of the new replacement sensor is then recorded in the lookup table in the memory, using the processor and instrument.

In a preferred embodiment the identification tags are included in each of multiple sensors and groups of multiple sensors that are positioned along a conduit for sensing the condition of the conduit.

Actualizing each sensor sends an indication of the sensed condition, such as temperature, stress, strain, or size or shape deviation as well as the condition of the sensor and the identification of the sensor. The sensors are polled for determining condition of the conduit and pinpoint excess heat or deformities on or in the conduit. When the polling of the sensors occurs the condition and identification are also provided from each sensor and group of sensors. Alternatively, separate polling may be conducted for the condition and identification from each sensor and group of sensors.

The sensors may be used in any structure, rigid or flexible, or on conduits. Such conduits include conduits of optical fibers and bundles, wave guides, electromagnetic information, electrical wire and cables for power or signaling, conduits for fluids such as gaseous or liquid fuels, hydraulic or pneumatic service lines and other conduits.

The present invention is a method used to interrogate optical sensing fibers. The optical sensing fibers are all the same length and are used to monitor the same system. The system may be, but is not limited to, cable harnesses, hydraulic lines or electrical wires and are used to sense any physical change to the system such as temperature, humidity, electrical or magnetic fields or pressure. The testing system is designed to locate the distance where the physical change to the system occurs. The use of several optical fibers gives the ability to cover a large surface area as well as providing multiple test points.

Figure 4:
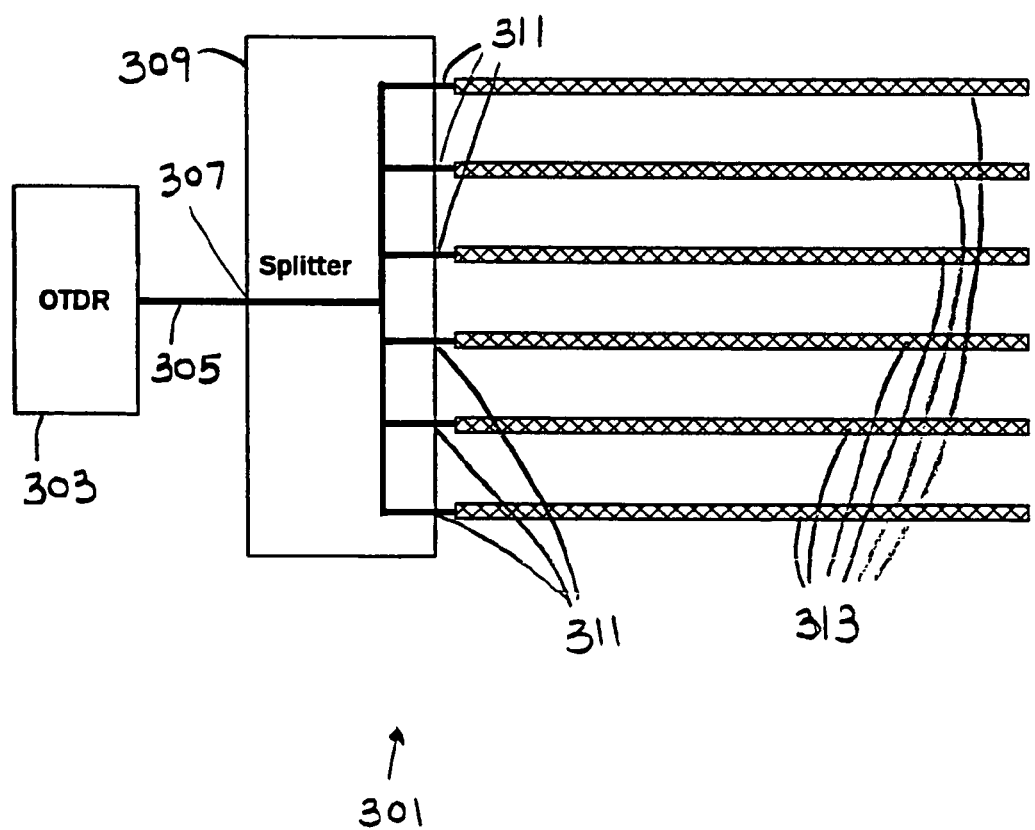
FIG. 4 is a schematic representation of an OTDR optically connected to an input port of a splitter.

FIG. 4 shows a system 301 where an OTDR 303 is optically connected 305 to an input port 307 of an optical splitter 309. Output ports 311 of the optical splitter 309 are connected to sensing fibers 313. The optical splitter 309 splits the input signal 305 of the OTDR 303 equally between the sensing fibers 313, allowing all the sensing fibers 313 to be tested at one time.

To test a multi-fiber sensing system, the OTDR 303 sends an optical signal 305 into the splitter 309. The optical splitter 309 evenly divides the optical signal 305 and sends the divided signals down each of the sensing fibers 313. The optical signal travels down each fiber 313 where some of the optical signals within each sensing fiber 313 are reflected back to the OTDR 303.

Figure 5:
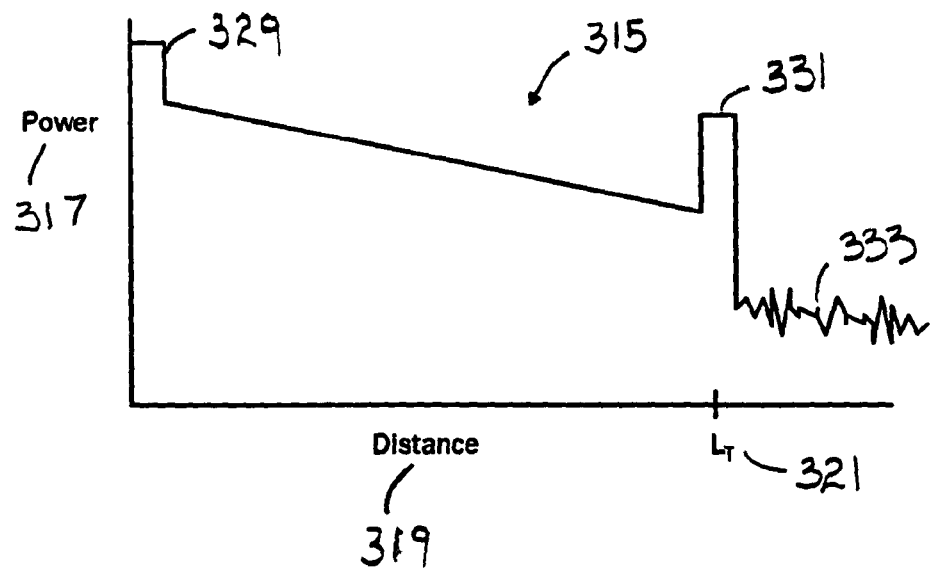
FIG. 5 is a graph of an OTDR trace showing loss as a function of position in a system without anomalies.

The OTDR 303 analyzes the reflected optical signal and produces an OTDR trace 315 describing loss in power 317 as a function of position 319 as shown in FIG. 5. $L_T$ 321 is the length of the sensing fiber 313. The overall OTDR trace 315 results of the multi-fiber system are a superposition of each individual fiber. If there is no change in the fiber characteristics due to an anomaly, i.e. pressure, temperature, electrical field, chafing, etc., the OTDR trace will appear similar to FIG. 5.

Figure 6:
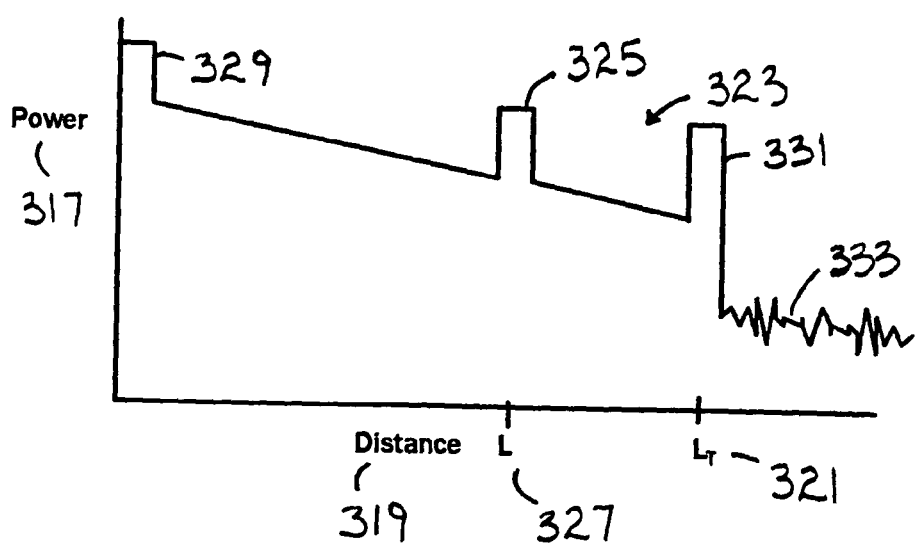
FIG. 6 is a graph of an OTDR trace showing loss as a function of position in a system with at least one anomaly.

However, if there is an anomaly, such as a break in one of the sensing fibers, an OTDR trace 323 shows the effects of the anomaly 325 somewhere between 0 and $L_T$ 321. FIG. 6 shows an example of a fiber break for one or more, but not all, of the fibers at a position L 327. FIGS. 5 and 6 show peaks for the beginning 329 and end 331 of the optical fibers as well as noise 333 past the length $L_T$ of the fibers 313. Other anomalies that may be detected include conduit chafing, pinch points, installation problems and tightness relative to conduit clearances.

While the invention has been described with reference to specific embodiments, modifications and variations of the invention may be constructed without departing from the scope of the invention.

I claim:

1. An apparatus for monitoring integrity of sensors and determining locations of anomalies comprising:
   a microprocessor,
   a storage device,
   a test instrument,
   a distribution system including switching systems,
   wherein the microprocessor controls the distribution system, the switching systems, the test instrument, and the storage device,
   one or more sensing systems comprising the sensors, each attached to the distribution system,
   a database stored on the storage device,
   wherein the database contains information on the types, locations, and baseline information of the sensors,
   a display,
   and an alarm,
   wherein the microprocessor accesses the database, the distribution system selects the sensors to be tested, the test instrument sends signals to the sensors to be tested and collects measured data, and the microprocessor analyzes the data, compares the data with baseline data for the sensors to be tested, and displays anomalies on the display and keys the alarm when the anomalies are detected.

2. The apparatus of claim 1, wherein the sensors are optical fibers, electrical wires, insulators, capacitors, resistors, or any sensors which are mounted in arrays.

3. The apparatus of claim 1, wherein the sensors are connected over an entire length or surface of a protected device, area or volume.

4. The apparatus of claim 1, wherein the distribution system further comprises an optical splitter, wherein an OTDR is optically connected to an input port of the optical splitter and output ports of the optical splitter are connected to sensing fibers, the optical splitter splits an input signal from the OTDR equally between the sensing fibers, the signals travel down the sensing fibers, some of the signals within each fiber are reflected back to the OTDR, and the OTDR analyzes the reflected optical signals and detects any anomalies in the fibers and their locations.

5. The apparatus of claim 1, wherein the switching systems further comprise one or more main switching systems with one or more subsidiary switching systems.

6. The apparatus of claim 1, further comprising conduits carrying power or signal lines and wherein the sensors are sensing optical fibers on or in the conduits along entire lengths of the conduits for sensing and providing information of physical and operational conditions of the conduits and the power or signal lines.

7. The apparatus of claim 1, further comprising optical tags, one or more optical sources, and one or more optical detectors, wherein information is stored on each optical tag, which is extracted from each optical tag by probing the tag with the one or more optical sources and transmitted to one optical detector via light from the one or more optical sources, where the information is converted into an electrical signal and sent to the microprocessor to be analyzed and decoded.

8. The apparatus of claim 6, further comprising light pulsers and light pulse receivers optically connected to the optical fibers, processors connected to the pulsers and receivers, and memory connected to the processors for establishing and storing baseline information from the optical fibers in the memory and for comparing in the processor stored information from the memory with current information from the receivers.

9. The apparatus of claim 7, wherein the information stored on the optical tags is invisible.

10. The apparatus of claim 7, wherein each optical tag selectively stops a wavelength or wavelengths of the light from one of the optical source, allowing the rest of the light to pass through to one of the one optical detectors.

11. The apparatus of claim 7, wherein coded information in each optical tag changes a wavelength or wavelengths of the light from the one optical source to other wavelength or wavelengths detectable by the one optical detector.

12. The apparatus of claim 7, wherein the one or more optical detectors have detector arrays.

13. The apparatus of claim 7, wherein the optical tags store personal or document identification or identify items or cargo in containers.

14. The apparatus of claim 7, wherein the information stored on the optical tags directs a user to a virtual information description or a look-up file of additional information.

15. The apparatus of claim 7, wherein the information is stored in a different location from the sensors and can be accessed over a network as instructed by an optical tag.

16. The apparatus of claim 7, wherein individual sensors can be removed or exchanged for other sensors as desired and the optical tags contain the information necessary to allow the microprocessor to recognize new sensors.

17. A method for monitoring integrity of sensors and determining locations of anomalies comprising:
providing a microprocessor,
providing a storage device,
providing a test instrument,
providing a distribution system including switching systems,
controlling the distribution system, the switching systems, the test instrument, and the storage device with the microprocessor,
providing one or more sensing systems, providing sensors in the sensing systems, attaching each sensing system to the distribution system,
providing a database stored on the storage device,
holding information on the types, locations, and baseline information of the sensors in the database,
providing a display,
and providing an alarm,
wherein the microprocessor accesses the database, the distribution system selects the sensors to be tested, the test instrument sends signals to the sensors to be tested and collects measured data, and the microprocessor analyzes the data, compares the data with baseline data for the sensors to be tested, and displays anomalies on the display and keys the alarm when the anomalies are detected.

18. The method of claim 17, wherein the providing the sensors comprises providing optical fibers, electrical wires, insulators, capacitors, resistors, or any sensors which are mounted in arrays.

19. The method of claim 17, further comprising connecting the sensors over an entire length or surface of a protected device, area or volume.

20. The method of claim 17, wherein the distribution system further comprises providing an optical splitter, with an input port and output ports and optically connecting an OTDR to an input port of the optical splitter and connecting output ports of the optical splitter to sensing fibers, splitting input signals from the OTDR equally between the sensing fibers, traveling the signals down the sensing fibers, reflecting back some of the signals within each fiber to the OTDR, and analyzing the reflected optical signals and detecting any anomalies in the signals according to the fibers and their locations.

21. The method of claim 17, wherein the providing of the switching systems further comprises, providing one or more main switching systems and providing one or more subsidiary switching systems connected to the main switching systems.

22. The method of claim 17, further comprising providing optical tags, providing one or more optical sources, and providing one or more optical detectors, storing information on each optical tag, and extracting the stored information from each optical tag by probing the tag with the one or more optical sources and transmitting the extracted information to the one or more optical detectors via light from the optical source, and converting the transmitted information into electrical signals in the optical detectors and sending the electrical signals to the microprocessor for analyzing and decoding.

23. The method of claim 22, wherein the information stored on the optical tags is invisible.

24. The method of claim 22, wherein each optical tag selectively stops a wavelength or wavelengths of the light from one of the optical sources, allowing a remainder of the light to pass through to one of the one optical detectors.

25. The method of claim 22, wherein coded information in each optical tag changes a wavelength or wavelengths of the light from the one optical source to other wavelength or wavelengths detectable by the one optical detector.

26. The method of claim 22, further comprising detector arrays on the one or more optical detectors.

27. The method of claim 22, further comprising storing personal or document identification or identifying items or cargo in containers with optical tags.

28. The method of claim 22, further comprising directing a user to a virtual information description or a look-up file of additional information with the information stored on the optical tags.

29. The method of claim 22, further comprising storing the information in a different location from the sensors and accessing the information over a network as instructed by an optical tag.

30. The method of claim 22, further comprising removing or exchanging individual sensors for other sensors as desired and the optical tags and containing therein information necessary to allow the microprocessor to recognize new sensors.

* * * * *